United States Patent [19]
Zenmei et al.

[11] Patent Number: 5,675,202
[45] Date of Patent: Oct. 7, 1997

[54] GENERATOR HAVING PULLEY WITH ONE-WAY CLUTCH

[75] Inventors: Keisaku Zenmei; Shuzo Isozumi, both of Hyogo, Japan

[73] Assignee: Mitsubishi Denki Kabushi Kaisha, Tokyo, Japan

[21] Appl. No.: 547,141

[22] Filed: Oct. 24, 1995

[30] Foreign Application Priority Data

May 22, 1995 [JP] Japan ................ 7-122620

[51] Int. Cl.$^6$ ................ H02K 7/10; F16D 41/07
[52] U.S. Cl. ................ 310/100; 310/78; 310/92; 310/96; 310/112; 192/45; 192/113.32; 474/112; 474/116; 474/117
[58] Field of Search ................ 310/100, 76, 78, 310/92, 96; 192/84 C, 84 B, 45, 113.32; 474/112, 116, 117

[56] References Cited

U.S. PATENT DOCUMENTS

| | | | |
|---|---|---|---|
| 3,563,352 | 2/1971 | Stibbe | 192/45 |
| 3,582,697 | 6/1971 | Bochan | 310/78 |
| 3,623,581 | 11/1971 | Livezey | 192/45 |
| 3,920,107 | 11/1975 | Limbacher | 192/98 |
| 3,946,541 | 3/1976 | LaFollette et al. | 192/35 |
| 3,951,244 | 4/1976 | Neder | 192/98 |
| 4,227,600 | 10/1980 | Shirai | 192/84 |
| 4,287,976 | 9/1981 | Sakaki et al. | 192/84 |
| 4,467,904 | 8/1984 | Renaud | 192/98 |
| 4,476,744 | 10/1984 | Crooks | 74/751 |
| 4,718,526 | 1/1988 | Koitabashi | 192/35 |
| 4,725,259 | 2/1988 | Miyata | 474/70 |
| 4,917,655 | 4/1990 | Martin | 474/112 |
| 4,973,870 | 11/1990 | Uehara | 310/78 |
| 5,059,842 | 10/1991 | Euhara | 310/78 |

FOREIGN PATENT DOCUMENTS

| | | | |
|---|---|---|---|
| 171278 | 10/1951 | Australia. | |
| 3110761 | of 1981 | Germany. | |
| 56-101353 | 8/1981 | Japan | H02K 7/10 |
| 62-144546 | 6/1987 | Japan | H02K 7/10 |

Primary Examiner—Steven L. Stephan
Assistant Examiner—Tran N. Nguyen
Attorney, Agent, or Firm—Sughrue, Mion, Zinn, Macpeak and Seas

[57] ABSTRACT

Irregularities on the face of the pulley groove of the pulley for driving the rotor shaft of the generator through the one-way clutch are positively extended and a frictional force between the face and the belt is increased, so that a higher torque than the drag torque can be transmitted to the one-way clutch without causing a slippage of the belt. Since no slippage occurs on the belt, the belt life can be extended. Since the one way clutch is positively operated, the inertial energy of the rotor can be effectively recovered.

9 Claims, 5 Drawing Sheets

GENERATOR HAVING PULLEY WITH ONE-WAY CLUTCH

BACKGROUND OF THE INVENTION

The present invention relates to a generator for vehicle having a one-way clutch.

Figure 5:
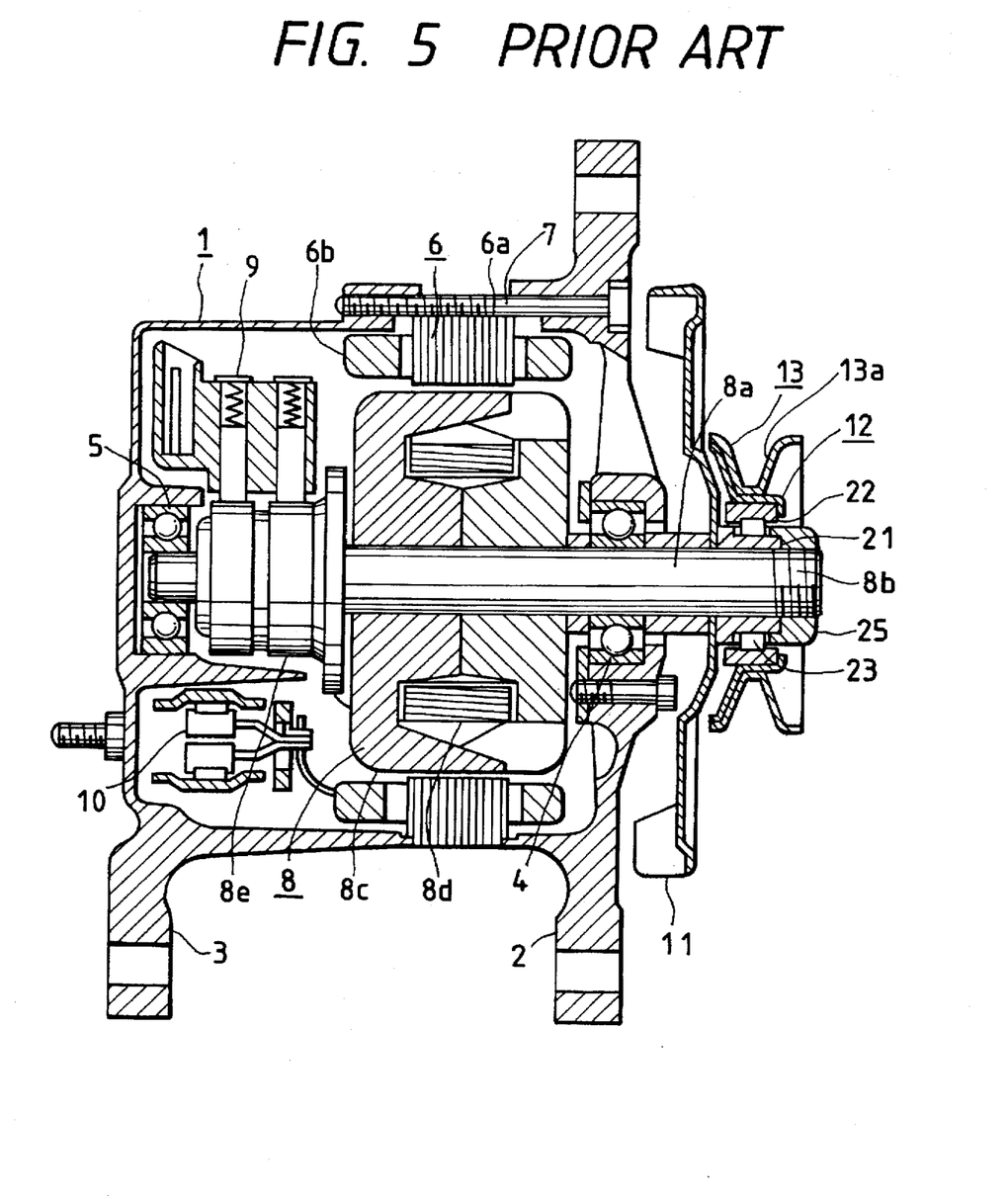
FIG. 5 is a view showing the arrangement of the generator of the prior art.
Figure 6:
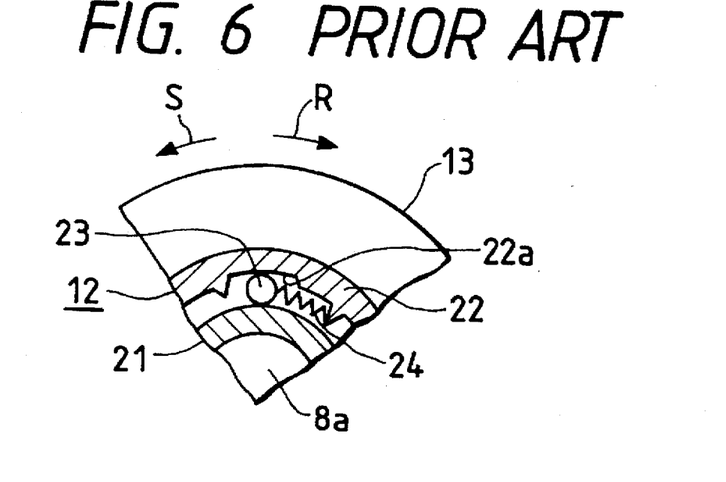
FIG. 6 is a cross-sectional view showing the one-way clutch of the generator of the prior art shown in FIG. 5.

FIGS. 5 and 6 are views showing a generator for vehicle (referred to as a generator hereinafter in this specification) of the prior art, for example, disclosed in Unexamined Japanese Patent Publication 56-101353 (1981). FIG. 5 is an arrangement view of the generator, and FIG. 6 is a cross-sectional view showing a primary portion of the one-way clutch. In these views, numeral 1 is a generator body of the three-phase synchronous generator, which is composed as follows. Numeral 2 is a front bracket, and numeral 3 is a rear bracket. A front side bearing 4 and a rear side bearing 5 are respectively attached at the centers of the brackets. Numeral 6 is an armature, which includes an armature iron core 6a and an armature coil 6b wound around the armature iron core 6a. The armature iron core 6a is clamped to both brackets by clamping bolts 7 in the transverse direction in the drawing, so that the armature iron core 6a is supported by the brackets.

Numeral 8 is a rotor, which includes a rotor shaft 8a to be used as a rotational shaft, and a male screw 8b formed at a right end of the rotor shaft 8a in the drawing. Further, the rotor 8 includes a cylindrical magnetic pole iron core 8c having a claw-shaped magnetic pole attached to the rotor shaft 8a, a field coil 8d wound around the magnetic pole iron core 8c, and a slip ring 8e connected to the field coil 8d, wherein the slip ring 8e is attached to the rotor shaft 8a. The rotor shaft 8a is rotatably supported by both brackets 2, 3 through the bearings 4, 5 so that the magnetic pole iron core 8c can be disposed inside the armature iron core 6a.

Numeral 9 is a brush, which supplies an exciting current to the field coil 8d through the slip ring 8e. Numeral 10 is a rectifier, which rectifies an alternating current generated in the armature coil 6b. Both brush 9 and rectifier 10 are attached inside the rear bracket 3. Numeral 11 is a fan, which is disposed outside the front bracket 2 and attached to the rotor shaft 8a. Fan 11 rotates together with the rotor 8 and supplies the outside air into the generator body so that the generator can be cooled. The generator body 1 is composed in the above manner.

Numeral 12 is a one-way clutch (referred to as a clutch hereinafter), and numeral 13 is a pulley, wherein the clutch 12 is disposed between the rotor shaft 8a and the pulley 13. The pulley 13 is provided with a pulley groove 13a, the section of which is a V-shape. A belt not shown in the drawing is wound around the pulley 13. Through the belt, the pulley 13 is driven by an engine which is a power unit. Irregularities on the surface of the pulley groove 13a on which the belt is wound, that is, surface roughness of the pulley groove 13a is relatively accurate. In other words, the surface of the pulley groove 13a is machined accurately so that the irregularities are low.

Next, with reference to FIG. 6, the structure of the clutch 12 will be explained in detail. Numeral 21 is an inner clutch member, numeral 22 is an outer clutch member, and numeral 22a is a wedge-shaped cam groove (shown in FIG. 6). A plurality of cam grooves 22a are provided on the inner circumference of the outer clutch member 22 in the circumferential direction. As illustrated in FIG. 6, the sectional shape of the cam groove 22a is formed into a wedge-shape, the depth in the radial direction of which is reduced when it comes to the left in the drawing.

2

Numeral 23 is a roller, and numeral 24 is a roller spring. The roller 23 is inserted into the cam groove 22a between the inner and outer clutch members 21 and 22. The roller 23 is pushed by the roller spring 24 in a direction opposite to arrow R shown in FIG. 6.

The inner clutch member 21 is attached to the rotor shaft 8a and fixed by a nut 25 (shown in FIG. 5) so that it can not be pulled out in the axial direction. The outer clutch member 22 is fixed to the pulley 13.

Next, the operation will be explained below.

The rotor 8 of this generator is driven by an engine not shown through a belt (not shown) which is provided between the engine and the pulley 13, so that the rotor 8 is rotated in the direction of arrow R in FIG. 6. Three-phase alternating power is generated in the armature coil 6b by the rotation of the rotor 8. This alternating power is converted into a DC current by the rectifier 10, so that an electric power is supplied to the car.

When a relative rotation is generated between the engine and the rotor 8 due to the pulsation, acceleration or deceleration of the engine, the clutch 12 functions. Specifically, when the engine is accelerated, the clutch 12 transmits a torque, and the rotor 8 is driven by the engine. On the contrary, when the engine is decelerated, the clutch 12 is idled, so that the rotor 8 is not decelerated but continues to rotate by the action of inertia. Therefore, the energy efficiency is enhanced, and the slippage of the belt is prevented, so that the belt life is extended.

The operation of the clutch 12 is explained in more detail. The pulley 13 is driven by the engine in the direction of arrow R in FIG. 6. When the engine speed is higher than the rotational speed of the rotor 8 of the generator, the roller 23 pushed by the roller spring 24 in the direction of arrow S is moved in the cam groove 22a to the left in FIG. 6. As a result, the roller 23 bites between the inner and outer clutch members 21 and 22, so that the drive force of the pulley 13 is transmitted to the rotor shaft 8a.

On the other hand, in the case of deceleration of the engine, especially in the case of sudden deceleration of the engine, the rotational speed of the inner clutch member 21 is became higher than the rotational speed of the outer clutch member 22 by the action of inertia of the rotor 8. Due to the foregoing, the outer clutch 22 is given a brake force (a force in the direction of S in FIG. 6) by the belt. Therefore, the roller 23 is moved to the right in FIG. 6, resisting a spring force of the roller spring 24. Accordingly, the roller 23, which has bitten between the inner and outer clutch members, is released, and the rotor 8 idles at a higher speed than that of the outer clutch member 22. Consequently, the rotational speed of the rotor 8 is not reduced by the deceleration of the engine but is reduced while the inertial energy of the rotor 8 is converted into electric power. In this connection, an idling start torque at which the clutch starts idling will be referred to as a drag torque, hereinafter.

In this connection, the following problems have been found in the conventional generators having a clutch.

Figure 7:
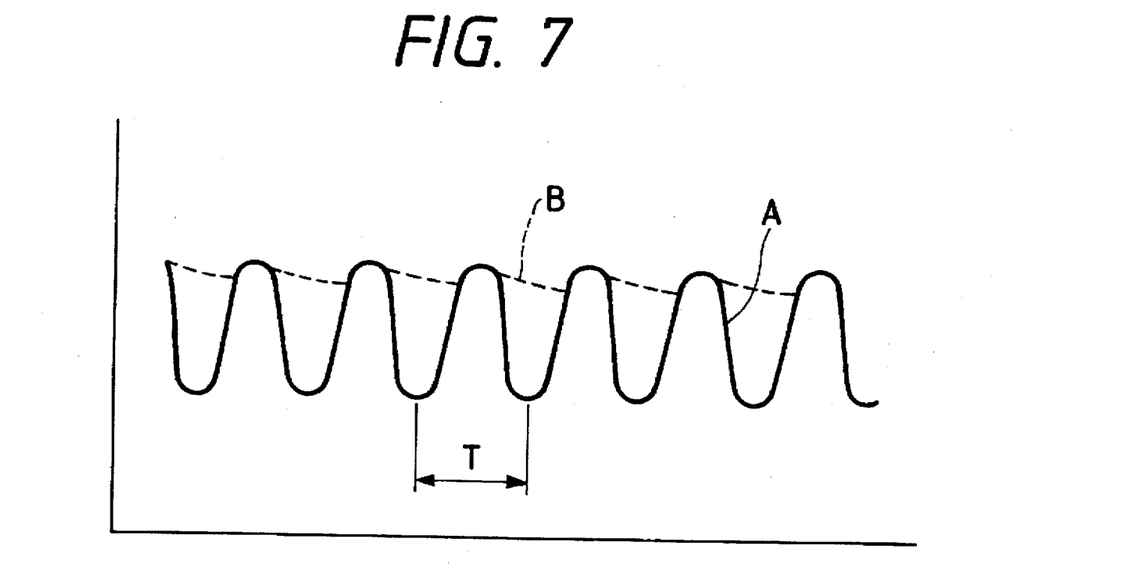
FIG. 7 is a schematic illustration for explaining the operation of the one-way clutch.

(a) FIG. 7 is a graph showing a relation between the rotational speeds of the pulley 13 and the engine and also showing a relation between the rotational speeds of the rotor shaft 8a and the engine when the engine speed fluctuates.

In the case of an engine of n-cylinders, period T of the rotational fluctuation of the pulley 13 is expressed by the following expression, $$T = 60/g \cdot N \cdot n$$

where N is the number of revolutions of the engine per one minute, and g is a pulley ratio. In this case, the pulley speed follows the fluctuation of engine speed and fluctuates as shown by character A in the drawing. When the clutch 12 is positively operated, the rotational speed of the rotor 8a should be approximately constant as shown by character B in the drawing by the action of the clutch 12.

However, it has been found that the rotational speed of the clutch 12 can not follow the fluctuation of the engine speed in quick response. When the rotor speed is higher than the engine speed, the rotor 8 rotates by its own inertia. At this time, a direction of the force given to the belt is reversed. Due to the foregoing, the belt is instantaneously loosened and then stretched in the reverse direction. When the belt is loosened in this way, since the face of the conventional pulley groove 13a is accurately machined and the frictional resistance is low, the phenomenon of slippage of the belt occurs when a frictional torque between the pulley groove 13a and the belt is lower than the drag torque of the clutch.

Especially in a region of high engine speed, since the period of the rotational fluctuation of an engine is short, the one-way clutch can not follow the fluctuation, so that the belt, which is a resilient body, absorbs the rotational fluctuation, and slippage of the belt tends to occur.

(b) Since the outer clutch member 22 is supported in the radial direction by the inner clutch member 21 through a plurality of rollers 23, it is difficult to ensure the dimensional accuracy of the wedge-shaped cam groove 22a (shown in FIG. 6), and the transmitted torque of the plurality of rollers can not be maintained uniform, and further the drag torque fluctuates and becomes unstable.

(c) When bearings are provided to improve the reliability and durability of the one-way clutch, it is necessary to stabilize the bearing life in such a manner that the thrust load given to the pulley is supported.

SUMMARY OF THE INVENTION

The present invention has been accomplished to solve the above problems. It is an object of the present invention to provide a generator for vehicle, in which slippage of the belt is prevented to improve the durability of the belt and also to reduce energy consumption by effectively recovering the inertial energy of the rotor of the generator; and the reliability and life of the one-way clutch are improved.

According to the present invention, a generator for vehicles comprises: a one-way clutch including an outer clutch member and an inner clutch member, in which the one-way clutch idles and transmits no torque in a direction opposite to the predetermined direction when the torque is higher than a predetermined idling start torque; a pulley having a wrapping face on which a belt is wound, in which the pulley is driven through the belt, and a frictional force is maintained between the pulley and the belt so that a torque higher than the predetermined idling start torque can be transmitted in a direction opposite to the rotational direction without causing a slippage of the belt; and a rotor rotatably supported by a rotational shaft, wherein the rotational shaft is rotated integrally with the inner clutch member.

Further, in a generator for vehicles, irregularities on the wrapping face of the pulley are formed so that a frictional force higher than a predetermined value can be ensured between the pulley and the belt.

Further, in a generator for vehicles, the pulley is provided with a cylindrical fit portion at the center, the outer clutch member is provided with a cylindrical fit portion on the outer circumference, the outer clutch member is formed differently from the pulley, the fit portion of the outer clutch member is fitted to the fit portion of the pulley under the condition of tight fitting so that the pulley and the clutch can be integrally rotated.

Furthermore, in a generator for vehicles, the inner clutch member is provided with a cylindrical fit portion at the center, the inner clutch member is formed differently from the rotational shaft of the generator, and the rotational shaft is fitted to the fit portion of the inner clutch member under the condition of tight fitting so that the rotational shaft can be rotated integrally with the inner clutch member.

Furthermore, in a generator for vehicles, the outer clutch member is formed integrally with the pulley.

Moreover, in a generator for vehicles, a pair of bearings are arranged between the pulley and the clutch interposing rollers in the axial direction, and a load of the pulley is supported by the inner clutch member through these bearings.

Moreover, in a generator for vehicles, a regulating member to regulate a movement of the bearing in the axial direction is provided in at least one of the pulley, inner clutch member and rotational shaft.

Still further, in a generator for vehicles, the regulating member provided in the pulley is a pair of step portions to which the bearings provided on both sides of the pulley in the axial direction are attached, the regulating member provided in the inner clutch member is a flange, the diameter of which is larger than the inner diameter of the bearing, one of the pair of bearings is interposed between the flange and one of the pair of the step portions, and the regulating member provided on the rotational shaft is a washer, the other of the pair of bearings is interposed between the washer and the other of the pair of step portions.

When the speed of the drive unit of a car is decelerated, the rotor of the generator for vehicles attempts to maintain its speed by its inertial energy so that the speed can be higher than the rotational speed of the pulley. Accordingly, the one-way clutch is given a torque in a direction reverse to the predetermined rotational direction. When this torque in the reverse direction is higher than the idling start torque of the one-way clutch, the one-way clutch idles and the rotor is rotated at a speed higher than that of the pulley. Consequently, the rotor continues to rotate by its inertia without being given a brake force by the pulley. Therefore, the inertial energy of the rotor is effectively recovered in the form of electric generating power, so that the energy consumption can be reduced.

However, when a torque in a direction reverse to the predetermined rotational direction is given to the one-way clutch, the belt is instantaneously loosened, and a frictional force between the belt and the pulley is decreased. Even when the frictional force is decreased in the above manner, it is preferable that the inertial energy of the rotor is more effectively recovered by transmitting a torque higher than the idling start torque from the belt to the one-way clutch without causing a slippage so that the rotor can be positively idled. When a slippage occurs between the belt and the one-way clutch, the belt life is shortened. Accordingly, it is necessary to prevent the occurrence of a slippage for the purpose of improving the durability of the belt.

In the generator for vehicles according to the present invention, the frictional force between the wrapping face and the belt is ensured to be higher than a predetermined value. Therefore, a torque higher than the idling start torque is transmitted from the belt to the one-way clutch without causing a slippage. Accordingly, the one-way clutch is positively operated. Consequently, the inertial energy of the rotor can be effectively recovered. Since the slippage is not caused, the belt durability is improved.

Further, irregularities on the wrapping face of the pulley around which the belt is wrapped are increased, that is, the surface roughness and the undulation on the wrapping face are increased. Therefore, it is possible to provide a high frictional coefficient between the belt and the wrapping face. Consequently, the transmitted frictional force is increased. Further, since it is easy to increase the irregularities on the wrapping face, the above measures can be taken at low cost.

Furthermore, the pulley is formed separately from the outer clutch member, so that they can be machined separately from each other. Therefore, they can be easily machined. For example, when the outer clutch member is made by means of cold forging, the blank shape is simple, and further the pulley can be easily machined. Besides, when one of them is made, for example, when the cam groove of the outer clutch member is subjected to quenching, it is possible to prevent a deformation of the pulley caused by the influence of the quenching of the cam groove. Accordingly, the roundness can be ensured. Further, both are fitted to each other by means of tight fitting. Accordingly, as compared with a case in which both are connected by means of welding, less strain is generated. From this viewpoint, it is easy to ensure the accuracy such as roundness.

Furthermore, the inner clutch member and the rotational shaft are separately formed from each other. Accordingly, both can be easily machined. Since the inner clutch member may be designed in accordance with the rotational shaft, degree of freedom of the combination of the rotational shaft and the one-way clutch can be extended.

Furthermore, the outer clutch member and the pulley are integrally formed, so that the number of parts can be reduced.

Moreover, since a load given to the pulley is primarily supported by the bearings, the dimensions of the outer and inner clutch members in the radial direction can be stabilized, and the fluctuation of transmitted torque can be suppressed among a plurality of rollers. Consequently, the idling start torque value is stabilized, and further the reliability and durability can be enhanced.

Moreover, the regulating member receives a force impressed upon the bearing in the axial direction, so that the movement in the axial direction is regulated. Accordingly, the bearing life can be stabilized.

Still further, the movement of the bearing in the axial direction is regulated by the washer, the flange of the inner clutch member or the step portion of the pulley. Accordingly, the movement of the bearing in the axial direction can be regulated by the regulating member of a simple structure. Therefore, it is possible to easily manufacture the generator at low cost.

DETAILED DESCRIPTION OF PREFERRED EMBODIMENTS

EMBODIMENT 1

Figure 1:
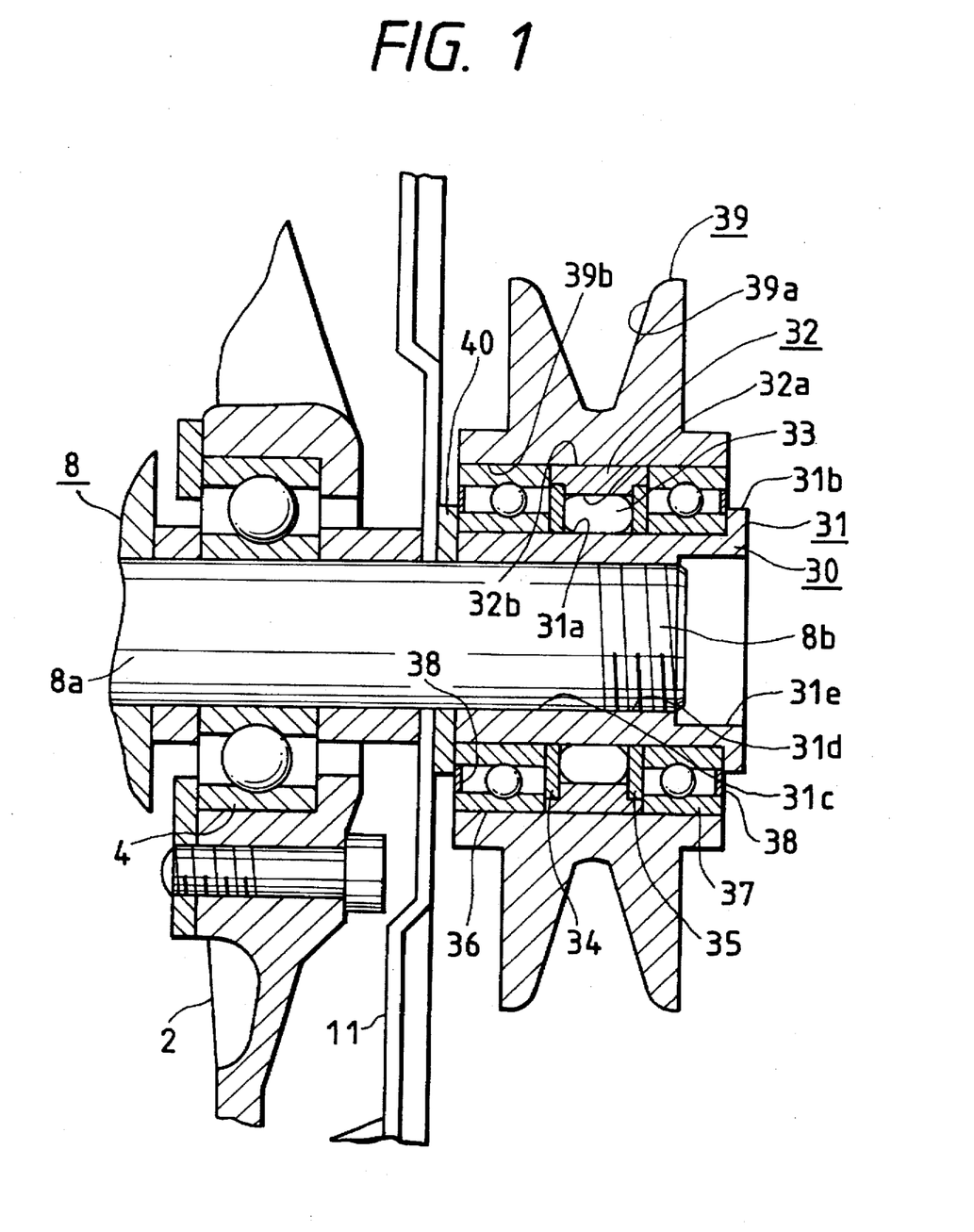
FIG. 1 is a cross-sectional view of the primary portion of the generator showing an embodiment of the present invention.

With reference to FIG. 1, an embodiment of the present invention will be explained below. FIG. 1 is a cross-sectional view showing a primary portion of the generator of the present invention. In FIG. 1, numerals 1 to 11 are the same as those of the conventional generator shown in FIG. 6. Therefore, like parts are identified by the same reference numeral, and the explanations are omitted here. However, as illustrated in the drawing, the rotor shaft 8a is shorter than the conventional one, which is only one different point. This will be described in detail later.

Numeral 30 is a clutch, which is composed as follows. Numeral 31 is an inner clutch member, which is formed to be hollow and cylindrical. A flange 31b, which is a regulating member, the outer diameter of which is extended, is integrally formed at the right end of the outer circumferential portion 31a of inner clutch member 31. The inner diameter of the hollow portion 31c and the outer diameter of the rotor shaft 8a are determined to be in a positional relation which the inner diameter of the hollow portion 31c has a small clearance with respect to the outer diameter of the rotor shaft 8a so that they are subjected to clearance-fitting. A female screw 31d is formed at the right of the hollow portion 31c. The female screw 31d is screwed to a male screw 8b formed on the rotor shaft 8a. Further, a hexagonal hole 31e is formed at the right end of the hollow portion 31c. This hexagonal hole 31e is used when the inner clutch member 31 is turned with a hexagonal wrench so as to screw the inner clutch member 31 to the male screw 8b of the rotor shaft. Due to the foregoing structure, the nut 25 of the conventional generator shown in FIG. 5 is not required, so that the length of the rotor shaft 8a and the overall length of the generator can be reduced.

Numeral 32 is an outer clutch member, which is a hollow cylindrical member made of forged steel. In the same manner as that shown in FIG. 6, a plurality of wedge-shaped cam grooves 32a and a cylindrical outer circumferential portion 32b, which is a fitting portion, are formed in the hollow portion of the outer clutch member 32. Numeral 33 is a roller, which is attached into the cam groove 32a. Although not shown in the drawing, in the cam groove 32a, there is provided a member which is the same as the roller spring 24 shown in FIG. 6. In this connection, after the cam groove 32a of the outer clutch member 32 has been subjected to the processing of gas cementation, it is quenched.

Numerals 34, 35 are washers provided on both sides of the rollers 33 in the axial direction. Due to the washers, dislocation of the rollers is prevented. In this connection, the washer 34 is press-fitted into the left step portion of the inner clutch member 31, and the washer 35 is press-fitted into the right step portion of the inner clutch member 31. A small clearance is formed between the inner circumferences of the washers 34, 35 and the outer circumference of the inner clutch member 31 so that the washers 34, 35 can be easily inserted into the inner clutch member 31.

Grease for lubrication fills the periphery of the rollers 33 surrounded by the washers 34, 35, outer clutch member 32, inner clutch member 31 and cam groove 32a (not shown in the drawing). The thus composed outer clutch member 32 is press-fitted into the hollow portion 39a of the pulley 39 described later. In this way, a predetermined tight fitting condition can be provided between the outer clutch member 32 and the pulley 39.

Numerals 36, 37 are ball bearings. An annular seal member 38 is provided between the inner and outer races on the left (on the side of the generator 1) of the ball bearing 36, and also an annular seal member 38 is provided between the inner and outer races on the right of the ball bearing 37. In this connection, for the purpose of reduction of the cost, there is provided no seal member on the inside of each ball bearing, that is, on the side opposite to the annular seal member 38 described above. Of course, the ball bearings 36, 37 are filled with grease for lubrication, however, there is no seal member for dust-proof and water-proof on the inside of the ball bearing as described above. The reason is that no problem may be encountered even when the lubricant for the cam groove 32a and the lubricant in the ball bearings 36, 37 are mixed with each other.

Numeral 39 is a pulley having a pulley groove 39a, the section of which is a V-shape, wherein the pulley groove 39a is composed of a wrapping face on which the belt is wound, and the pulley 39 also has a cylindrical hollow portion 39b which is a fitting portion. A belt not shown is wound around the pulley 39 and driven by an engine which is a power unit. A surface of the pulley groove 39a is provided with sufficiently high irregularities so that a predetermined frictional coefficient can be provided. Of course, the roundness of the pulley groove 39a is set at a predetermined value, so that a contact area of the pulley groove with the belt can be stably maintained. In addition to that, an area of the face of the pulley groove 39a is extended. Therefore, a sufficiently high frictional force can be provided between the pulley groove and the belt. The pulley 39 is made of forged steel in such a manner that a forged steel piece is machined so that the face having predetermined irregularities of the pulley groove 39a can be formed. In the process of machining, predetermined irregularities are formed.

The outer circumference 32b of the outer clutch member 32 and the ball bearings 36, 37 are press-fitted into the hollow portion 39b of the pulley 39 so that a tight fitting condition can be provided, and the inner race of the ball bearing is press-fitted into the inner clutch member 31 under the condition of tight fitting. Numeral 40 is a washer which is a regulating member. The washer 40 is interposed between a left end portion of the inner clutch member 31 and a fan 11 of the generator body 1.

The thus composed clutch 30 and pulley 39 are assembled and attached to the rotor shaft 8a in the following manner. First, the washer 34 is press-fitted to the left of the outer clutch 32 in the drawing. Next, in the same manner as that shown in FIG. 6, the roller 33 and the roller spring are attached into the cam groove 32a, and then the right washer 35 is fitted to the outer clutch member 32 under the condition of stop-fitting. Next, the outer clutch member 32 is press-fitted into the hollow portion 39b of the pulley 39. Further, the ball bearings 36, 37 are press-fitted into the hollow portion 39b of the pulley 39 in such a manner that the outer clutch member 32 is interposed between the ball bearings. Then the inner clutch member 31 is press-fitted into the inner races of the ball bearings 36, 37 so that a tight fitting condition can be provided. In this connection, the outer circumference 31a of the inner clutch member 31 is fitted to the washers 34, 35 under the condition of clearance-fitting.

The thus assembled members are attached to the rotor shaft 8a into which the washer 40 has previously been inserted. When a hexagonal wrench is put into the hexagonal hole 31e and turned, the female screw 31d is screwed into the male screw 8b provided on the rotor shaft 8a, so that the assembled members are fixed to the rotor shaft 8a. The inner diameter of the hollow portion 31c of the inner clutch member 31 and the outer diameter of the rotor shaft 8a are determined to be in a positional relation in which the inner diameter of the hollow portion 31c has a small clearance with respect to the outer diameter of the rotor shaft 8a so that they are subjected to clearance-fitting. Therefore, when the inner clutch member 31 is attached to the rotor shaft 8a, the rotor shaft 8a functions as a guide. Accordingly, the eccentricity caused by a clearance between the male and female screws 8b, 31d is regulated.

The essential motion of the thus composed clutch 30 is the same as that of the clutch of the prior art illustrated in FIG. 5. As described above, when the irregularities on the wrapping face of the pulley groove 39a around which the belt is wound are extended, the frictional coefficient is increased. When the accuracy of the pulley groove, that is, the dimensions and roundness of the pulley groove are set to be not less than predetermined values, the contact condition of the pulley groove 39a with the belt is stabilized, and the fluctuation caused in accordance with the rotation is reduced, so that a necessary contact area can be stably ensured. Accordingly, a predetermined frictional force can be stably ensured, and the occurrence of slippage can be prevented. Consequently, even in a region of high engine speed, it is possible to give a frictional torque higher than the drag torque to the clutch 30 without causing a slippage of the belt. Since the slippage of the belt is prevented, the belt life can be extended.

In this connection, in order to ensure the surface hardness of the cam groove 32a, it is necessary to conduct a heat treatment on the outer clutch member 32. When the pulley 39 is formed separately from the outer clutch member 32, the pulley 39 is not affected by quenching. Accordingly, a quenching strain is not caused so that the roundness can be maintained in a good condition. Accordingly, there is no possibility of reduction of the contact area of the pulley and the belt. In addition to that, since the shape of the pulley is simple, the pulley can be easily machined.

Further, the diameter of the outer circumferential portion 31a of the inner clutch member 31 to which the rollers 33 are opposed, is the same as the diameter of the outer circumferential portion 31a to which the bearings 36, 37 are attached. Besides, no step portion is formed in the hollow portion 32a of the outer clutch 32. Therefore, these members can be easily machined and assembled as described above.

In this connection, the ball bearings 36, 37 are disposed on both sides of the outer clutch member 32 and the rollers 33, and support a load given by the pulley 39. Further, a dimensional relation in the radial direction between the outer and inner clutch members 32, 31 is regulated by the ball bearings 36, 37. Therefore, the dimensional accuracy between the cam groove 32a and the outer circumference 31a of the inner clutch member 31 can be ensured. Due to the foregoing, the outer clutch member 32 and the rollers 33 mainly fulfill the function of fitting to the inner clutch member 31, and the plurality of rollers 33 substantially equally transmit the torque. Accordingly, the reliability and life of the clutch 30 are enhanced, so that the drag torque value is stabilized.

In order to improve the anti-environment properties such as dust-proof and water-proof properties of the ball bearings 36, 37 so that the life can be extended, seal members 38 are provided at least on the outside of the ball bearings 36, 37, that is, the seal member is provided on the left of the ball bearing 36, and the seal member is provided on the right of the ball bearing 37. In this embodiment, no problem may be encountered even when the lubricant for the cam groove 32a and the lubricant in the ball bearings 36, 37 are mixed with each other inside the bearings. For this reason, in order to reduce the cost, there are provided no seal members inside the bearings, and the seal member is arranged only on one side of the bearing.

EMBODIMENT 2

Figure 2:
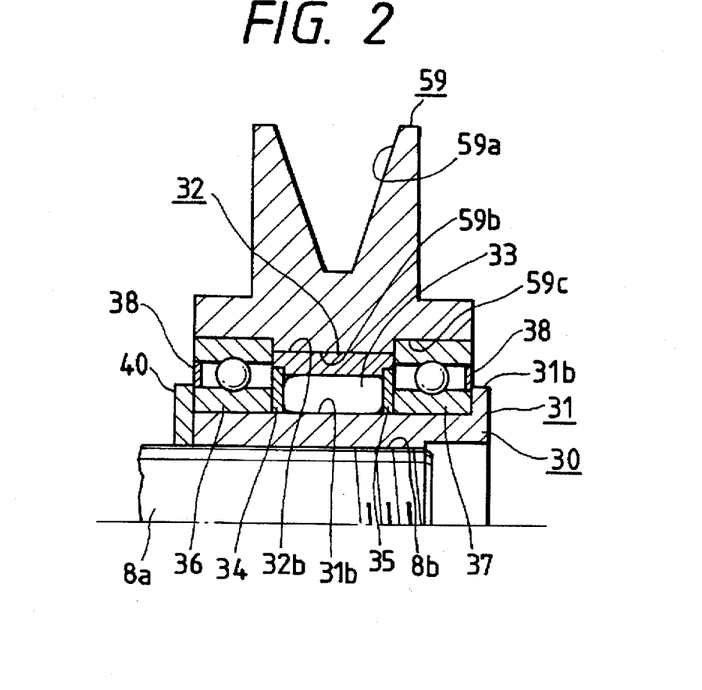
FIG. 2 is a cross-sectional view of the primary portion showing an upper half with respect to the center line of the generator of another embodiment of the present invention.

FIG. 2 is a cross-sectional view of an upper essential portion of another embodiment of the present invention. In this embodiment, step portions are provided in the pulley, and ball bearings are attached to the step portions. This embodiment will be explained as follows. In the drawing, numerals 1 to 33 and 40 are the same as those of the embodiment shown in FIG. 1. Therefore, like parts are identified by the same reference numeral, and the explanations are omitted here.

Numeral 59 is a pulley having a pulley groove 59a, the section of which is a V-shape, and the pulley 59 also has a cylindrical hollow portion 59b which is a fitting portion, and a step portion 59c on both sides of the hollow portion, wherein the step portion functions as a regulating member. A face of the pulley groove 59a, which is a wrapping face around which a belt not shown is wound, is provided with sufficiently high irregularities so that a predetermined frictional force higher than the drag torque can be obtained, and the dimensional accuracy of the pulley groove is set at a predetermined value, that is, the dimensional accuracy and roundness are set at predetermined values. In this embodiment, the irregularities on the face of the pulley 59a are formed by means of shot blasting. When the irregularities on the face of the pulley groove 59a are extended, the frictional force between the pulley groove and the belt is increased. When the dimensional accuracy such as the roundness is provided at a predetermined value, the contact area of the pulley groove can be ensured, and the fluctuation of the frictional force caused in accordance with the rotation can be reduced.

Assembling is conducted as follows. First, the outer clutch member 32, roller 33, roller spring and washers 34, 35 are integrally assembled into one unit in the same manner as that of the embodiment shown in FIG. 1. Next, the outer circumference 32b of the outer clutch member 32 is inserted into the hollow portion 39b of the pulley 39 that has been previously heated. In this way, shrinkage fitting is effected so as to provide a predetermined tight fitting condition. The ball bearings 36, 37 are press-fitted into the step portion 59c of the pulley 59, and the sides of the outer races of the ball bearings 36, 37 come into contact with the step portions 59c and receive the thrust of the pulley 59. From the viewpoint of improving the assembling property, a small clearance is provided between the inner races of the ball bearings 36, 37 and the inner clutch member 31 under the condition of clearance-fitting. This point is different from that of Embodiment 1 shown in FIG. 1.

The thus assembled unit is attached to the rotor shaft 8a into which the washer 40 has previously been inserted. The attaching method is the same as that of the embodiment shown in FIG. 1. In this connection, since the inner clutch member 31 is inserted into the washers 34, 35 and ball bearings 36, 37 under the condition of clearance-fitting, the insertion of the inner clutch member 31 is easy. Even under the condition of clearance-fitting, the movement of the pulley 59 in the axial direction is regulated by the flange 31b of the inner clutch member 31 and the washer 40.

In the above structure, the irregularities on the pulley groove and the dimensional accuracy such as the roundness are determined to be predetermined values so that a predetermined frictional force can be provided between the pulley groove 59a and the belt. Accordingly, the frictional force between the pulley groove and the belt, and the necessary contact area can be positively ensured. Therefore, it is possible to transmit a torque higher than the drug torque from the belt to the pulley 59 without causing a slippage of the belt.

The inner races of the ball bearings 36, 37 are received by the washer 40 and the flange 31b of the inner clutch member, and the sides of the outer races are received by the step portions 59c of the pulley 59. Accordingly, when the pulley 59 is pushed to the right in the drawing due to the error of the center of the pulley 59, the pulley 59 is regulated by the flange 31b of the inner clutch member 31 through the ball bearing 37. When the pulley 59 is pushed to the left in the drawing, the pulley 59 is regulated by the washer 40 through the bearing 36. Consequently, the life of the ball bearing can be extended.

EMBODIMENT 3

Figure 3:
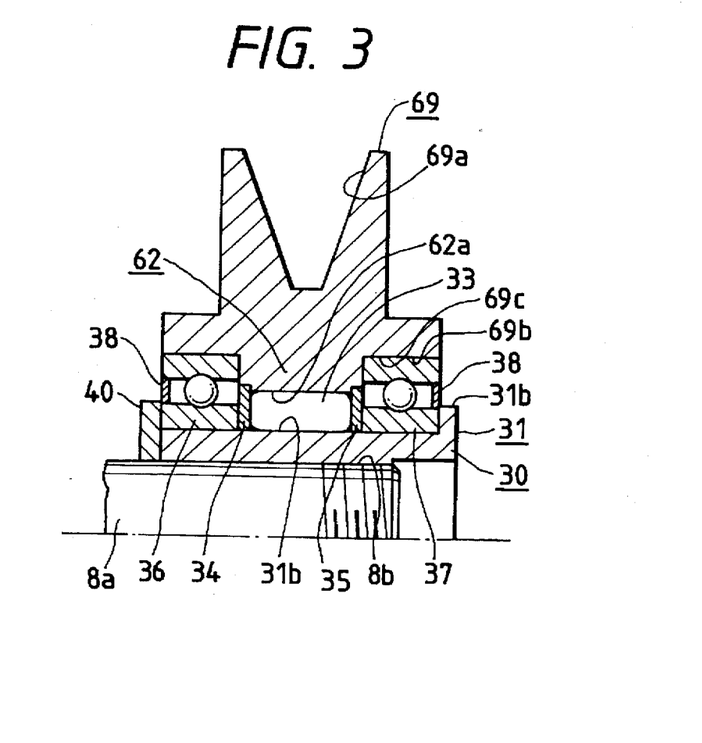
FIG. 3 is a cross-sectional view of the primary portion of the generator showing another embodiment of the present invention.

FIG. 3 is a cross-sectional view of the essential portion of still another embodiment of the present invention. In this embodiment, the outer clutch member and the pulley are integrated into one body.

Numeral 62 is an outer clutch member, and numeral 69 is a pulley. The outer clutch member 62 is formed in the hollow portion 69b of the pulley 69 integrally with the pulley 69. In the outer clutch member 62, there is provided a wedge-shaped cam groove 62a which is the same as that of the embodiment shown in FIG. 2. In the wedge-shaped cam groove 62a, the roller 33 and the roller spring not shown in the drawing are accommodated. The pulley 69 includes a pulley groove 69a, the section of which is formed into a V-shape, and a hollow portion 69b. The outer clutch member 62 protrudes into the hollow portion 69b as described above, and the hollow portion 69b is divided into the right and left halves by this outer clutch member 62. In the thus divided hollow portion 69b, the same step portions 69c as those of the embodiment shown in FIG. 2 are formed.

The outer clutch member 62 and the pulley 69 are integrally made of forging steel by means of cold forging. The degree of the irregularities on the face of the pulley groove 69a is adjusted at a predetermined value by means of shot blasting so that a predetermined frictional force can be provided between the pulley groove 69a and the belt. Besides, the dimensional accuracy of the pulley groove 69a is set at a predetermined value. Due to the foregoing, the contact area of the pulley groove 69a with the belt is stably maintained and further the frictional coefficient is increased, so that the slippage of the belt can be prevented.

Washers 34, 35 are fitted to both sides of the outer clutch member 62, and the ball bearings 36, 37 are press-fitted into the step portions 69c of the pulley 69 under the condition of tight fitting. The thus integrally assembled pulley 69, roller 33 and ball bearings 36, 37 are inserted into the inner clutch member 31 under the condition of tight fitting, and the inner clutch member 31 is screwed to the rotor shaft 8a so that the inner clutch member 31 can not be pulled out from the rotor shaft 8a.

Other members are the same as those of the embodiment shown in FIG. 2.

EMBODIMENT 4

Figure 4:
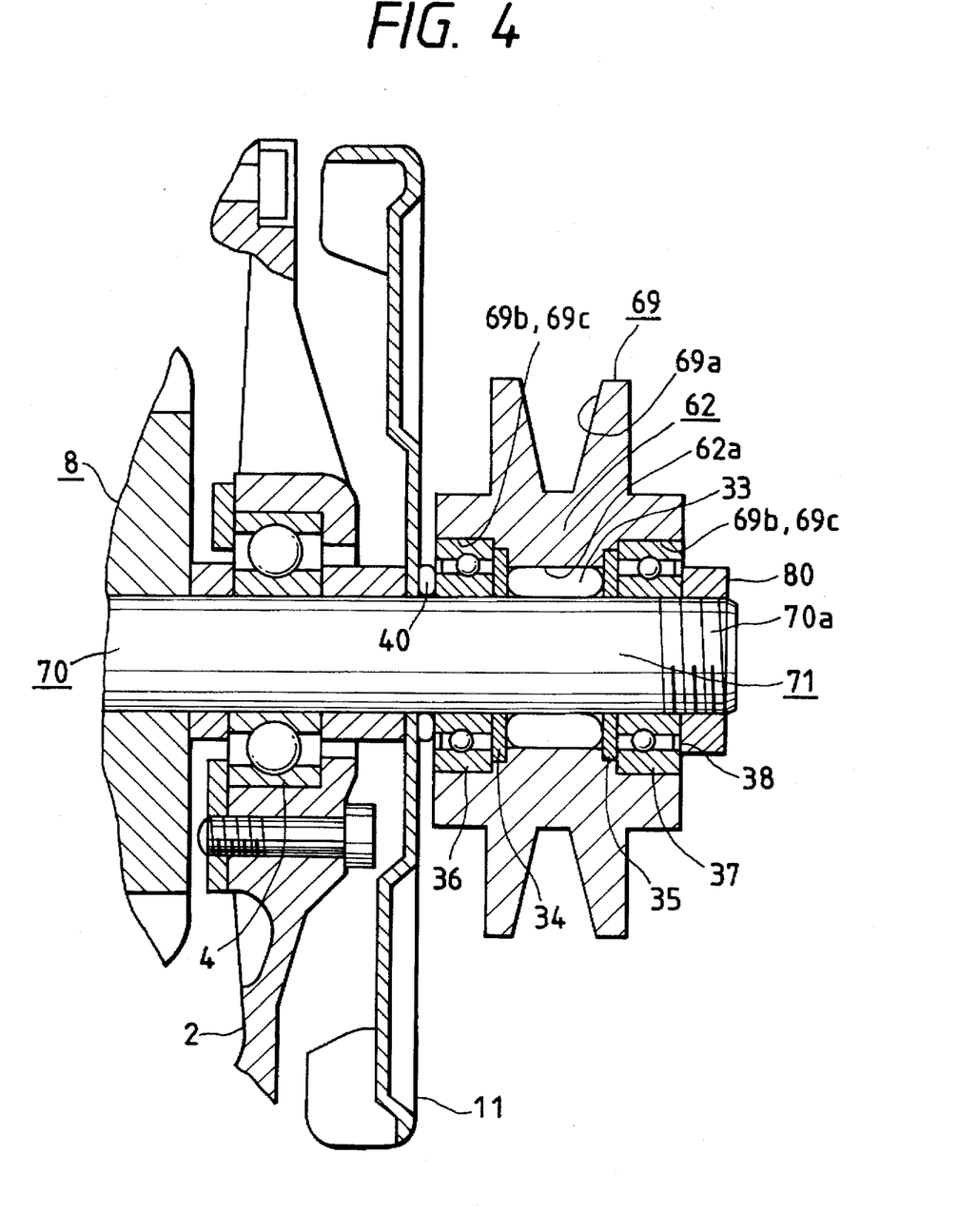
FIG. 4 is a cross-sectional view of the primary portion of the generator showing still another embodiment of the present invention.

FIG. 4 is a cross-sectional view of the essential portion of still another embodiment of the present invention. In this embodiment, the inner clutch member is also used as the rotor shaft, and the inner clutch member and the pulley are integrally formed.

Numeral 70 is a rotor shaft, and the right end portion of the rotor shaft 70 is also used as the inner clutch member 71. A male screw 70a is provided at the end of the rotor shaft 70. In this case, forging steel is used, and a portion of the outer circumference of the inner clutch member 71 which comes into contact with the rollers 33 is subjected to induction hardening.

The washers 34, 35 are fitted to the step portions on both sides of the outer clutch member 62, and the ball bearings 36, 37 are press-fitted into the step portions 69c of the pulley 69 under the condition of tight fitting. The thus integrally assembled pulley 69, roller 33, ball bearings 36, 37 are inserted into the inner clutch member 71 of the rotor shaft 70. At this time, the ball bearings 36, 37 are fitted to the inner clutch member 71 under the condition of stop-fitting. The ball bearings 36, 37 are not pulled out because of the action of the nut 80 which is a regulating member screwed to the male screw 70a.

Other members are the same as those of the embodiment shown in FIG. 3.

When the rotor shaft 70 is also used as the inner clutch member 71 and the outer clutch member 62 is formed integrally with the pulley 69, it is possible to reduce the number of parts and further it is not necessary to press-fit the outer clutch member into the pulley. Accordingly, it is possible to reduce the man-hours required for assembly. Further, the eccentricity of the pulley 69 with respect to the rotor shaft 70 can be reduced. Furthermore, a dimensional allowance is generated in the radial direction of the clutch, so that the degree of freedom is increased when the ball bearings 36, 37 and the roller 33 are selected in the process of designing.

In this connection, for example, in the embodiment shown in FIG. 1 or 3, the ball bearings 36, 37 may not be arranged between the inner clutch member 31 and the pulley 39 but may be arranged between the inner clutch member 31 and the outer clutch member 32. Of course, Embodiments 1 to 4 may be combined or changed within the scope of the claim of the present invention. It should be noted that the power unit is not be limited to a gasoline engine. Even when the present invention is applied to an internal combustion engine such as a diesel engine, the same effect can be provided. It should be also noted that the generator is not limited to a three-phase synchronous generator.

As described above, according to the present invention, a generator for vehicle comprises: a one-way clutch including an outer clutch member and an inner clutch member, in which the one-way clutch idles and transmits no torque in a direction opposite to the predetermined direction when the torque is higher than a predetermined idling start torque; a pulley having a wrapping face on which a belt is wound, in which the pulley is driven through the belt, and a frictional force is maintained between the pulley and the belt so that a torque higher than the predetermined idling start torque can be transmitted in a direction opposite to the rotational direction without causing a slippage of the belt; and a rotor rotatably supported by a rotational shaft, in which the rotational shaft is rotated integrally with the inner clutch member. Accordingly, the idling start torque is transmitted from the belt to one-way clutch without causing a slippage, so that the one-way clutch is positively operated. Therefore, the inertial energy of the rotor can be effectively recovered and the energy consumption can be reduced, and further the durability of the belt is enhanced.

Further, irregularities on the wrapping face of the pulley are formed so that a frictional force higher than a predetermined value can be ensured between the pulley and the belt. Accordingly, the idling start torque is transmitted from the belt to one-way clutch without causing a slippage, so that the one-way clutch is positively operated. Therefore, the inertial energy of the rotor can be effectively recovered and the energy consumption can be reduced, and further the durability of the belt is enhanced.

Further, the pulley is provided with a cylindrical fit portion at the center, the outer clutch member is provided with a cylindrical fit portion on the outer circumference, the outer clutch member is formed differently from the pulley, the fit portion of the outer clutch member is fitted to the fit portion of the pulley under the condition of tight fitting so that the pulley and the clutch can be integrally rotated. Accordingly, both are easily machined and the cost is reduced.

Further, the inner clutch member is provided with a cylindrical fit portion at the center, the inner clutch member is formed differently from the rotational shaft of the generator, and the rotational shaft is fitted to the fit portion of the inner clutch member under the condition of tight fitting so that the rotational shaft can be rotated integrally with the inner clutch member. Therefore, when one is machined, the other is prevented from being deformed, so that the accuracy can be ensured. Further, both are fitted to each other under the condition of tight fitting. Accordingly, the generation of strain is reduced. From this point of view, it is easy to ensure the accuracy.

Furthermore, the outer clutch member is formed integrally with the pulley. Accordingly, the number of parts can be reduced.

Furthermore, a pair of bearings are arranged between the pulley and the clutch interposing rollers in the axial direction, and a load of the pulley is supported by the inner clutch member through these bearings. Since a load given to the pulley is primarily supported by the bearings, the dimensions of the outer and inner clutch members in the radial direction can be stabilized, and the fluctuation of transmitted torque can be suppressed among a plurality of rollers. Consequently, the idling start torque value is stabilized, and further the reliability and durability can be enhanced.

Moreover, a regulating member to regulate a movement of the bearing in the axial direction is provided in at least one of the pulley, inner clutch member and rotational shaft. Therefore, the regulating member bears a force impressed upon the bearing in the axial direction, so that the movement in the axial direction is regulated. Accordingly, the bearing life can be stabilized.

Still further, the regulating member provided in the pulley is a pair of step portions to which the bearings provided on both sides of the pulley in the axial direction are attached, the regulating member provided in the inner clutch member is a flange, the diameter of which is larger than the inner diameter of the bearing, one of the pair of bearings is interposed between the flange and one of the pair of the step portions, and the regulating member provided on the rotational shaft is a washer, the other of the pair of bearings is interposed between the washer and the other of the pair of step portions. Accordingly, the movement of the bearing in the axial direction can be regulated by the regulating member of a simple structure. Therefore, it is possible to easily manufacture the generator at low cost.

What is claimed is:

1. A generator for a vehicle, comprising:

a one-way clutch including a cylindrical hollow outer clutch member, an inner clutch member arranged coaxially with the outer clutch member, and a roller interposed between the outer and inner clutch member, said one-way clutch transmitting torque in a predetermined direction between the outer and inner clutch members, the one-way clutch idling and transmitting no torque in a direction opposite to the predetermined direction when the torque is higher than a predetermined idling start torque;

a pulley having a wrapping face on which a belt is wound, wherein the pulley is driven through the belt by a power unit to drive a car, and a frictional force is maintained between the pulley and the belt so that a torque higher than the predetermined idling start torque can be transmitted in a direction opposite to the rotational direction without causing a slippage of the belt; and a rotor rotatably supported by a rotational shaft of the generator body, the rotational shaft being rotated integrally with the inner clutch member, the outer clutch member being rotated integrally with the pulley, and a torque being transmitted from the pulley to the rotational shaft in the predetermined direction, wherein bearings are arranged between said pulley and said clutch, and said roller is disposed between said bearings in an axial direction of said rotational shaft, and a load on said pulley is supported by said inner clutch member through said bearings, wherein a regulating member to regulate a movement of the bearings in the axial direction is provided in the pulley, inner clutch member and rotational shaft, and wherein the regulating member provided in the pulley comprises a pair of step portions to which the bearings provided on both sides of the pulley in the axial direction are attached, the regulating member provided in the inner clutch member is a flange, the diameter of which is larger than the inner diameter of the bearings, one of the bearings being interposed between the flange and one of the pair of the step portions, and the regulating member provided on the rotational shaft is a washer, the other one of the bearings is interposed between the washer and the other one of the pair of step portions.

2. The generator for vehicle according to claim 1, wherein irregularities on the wrapping face of the pulley are formed so that a frictional force higher than a predetermined value can be ensured between the pulley and the belt.

3. The generator for vehicle according to claim 1, wherein the pulley is provided with a cylindrical fit portion at the center, the outer clutch member is provided with a cylindrical fit portion on the outer circumference, the outer clutch member is formed differently from the pulley, the fit portion of the outer clutch member is fitted to the fit portion of the pulley under the condition of tight fitting so that the pulley and the clutch can be integrally rotated.

4. The generator for vehicle according to claim 3, wherein the inner clutch member is provided with a cylindrical fit portion at the center, the inner clutch member is formed differently from the rotational shaft of the generator, and the rotational shaft is fitted to the fit portion of the inner clutch member under the condition of tight fitting so that the rotational shaft can be rotated integrally with the inner clutch member.

5. The generator for vehicle according to claim 1, wherein the outer clutch member is formed integrally with the pulley.

6. A generator for a vehicle, comprising:

a one-way clutch including a cylindrical hollow outer clutch member, an inner clutch member arranged coaxially with the outer clutch member, and a roller interposed between the outer and inner clutch member, said one-way clutch transmitting a torque in a predetermined direction between the outer and inner clutch members, the one-way clutch idling and transmitting no torque in a direction opposite to the predetermined direction when the torque is higher than a predetermined idling start torque;

a pulley having a wrapping face on which a belt is wound, wherein the pulley is driven through the belt by a power unit to drive a car, and a frictional force is maintained between the pulley and the belt so that a torque higher than the predetermined idling start torque can be transmitted in a direction opposite to the rotational direction without causing a slippage of the belt; and a rotor rotatably supported by a rotational shaft of the generator body, the rotational shaft being rotated integrally with the inner clutch member, the outer clutch member being rotated integrally with the pulley, and a torque being transmitted from the pulley to the rotational shaft in the predetermined direction, wherein the inner clutch member is fixedly secured to the rotational shaft for integral rotation therewith by being threadably engaged with the rotational shaft.

7. A generator for a vehicle, comprising:

a one-way clutch including a cylindrical hollow outer clutch member, an inner clutch member arranged coaxially with the outer clutch member, and a roller interposed between the outer and inner clutch members, said one-way clutch transmitting a torque in a predetermined direction between the outer and inner clutch members, the one-way clutch idling and transmitting no torque in a direction opposite to the predetermined direction when the torque is higher than a predetermined idling start torque;

a pulley having a wrapping face on which a belt is wound, wherein the pulley is driven through the belt by a power unit to drive a car, and a frictional force is maintained between the pulley and the belt so that a torque higher than the predetermined idling start torque can be transmitted in a direction opposite to the rotational direction without causing a slippage of the belt; and a rotor rotatably supported by a rotational shaft of the generator body, the rotational shaft being rotated integrally with the inner clutch member, the outer clutch member being rotated integrally with the pulley, and a torque being transmitted from the pulley to the rotational shaft in the predetermined direction, wherein a first regulating member is provided in the pulley, said regulating member comprising a pair of step portions to which bearings provided on both sides of the pulley in the axial direction are attached, a second regulating member is provided in the inner clutch member, said second regulating member comprising a flange, the diameter of said flange being larger than an inner diameter of the bearings, one of the bearings being interposed between the flange and one of the pair of the step portions, and a third regulating member is provided on the rotational shaft, said third regulating member comprising a washer, another one of the bearings being interposed between the washer and the other one of the pair of step portions.

8. A generator for a vehicle according to claim 6, wherein a hexagonal hole is formed at one side of the inner clutch member.

9. A generator for a vehicle according to claim 8, wherein bearings are arranged between said pulley and said clutch, and said roller is disposed between said bearings in an axial direction of said rotational shaft, and a load on said pulley is supported by said inner clutch member through said bearings, wherein a regulating member to regulate a movement of the bearings in the axial direction is provided in the pulley, inner clutch member and rotational shaft, and wherein the regulating member provided in the pulley comprises a pair of step portions to which the bearings provided on both sides of the pulley in the axial direction are attached, the regulating member provided in the inner clutch is a flange, the diameter of which is larger than the inner diameter of the bearings, one of the bearings being interposed between the flange and one of the pair of the step portions, and the regulating member provided on the rotational shaft is a washer, the other one of the bearings is interposed between the washer and the other one of the pair of step portions.

* * * * *